United States Patent Office 3,483,476
Patented Dec. 9, 1969

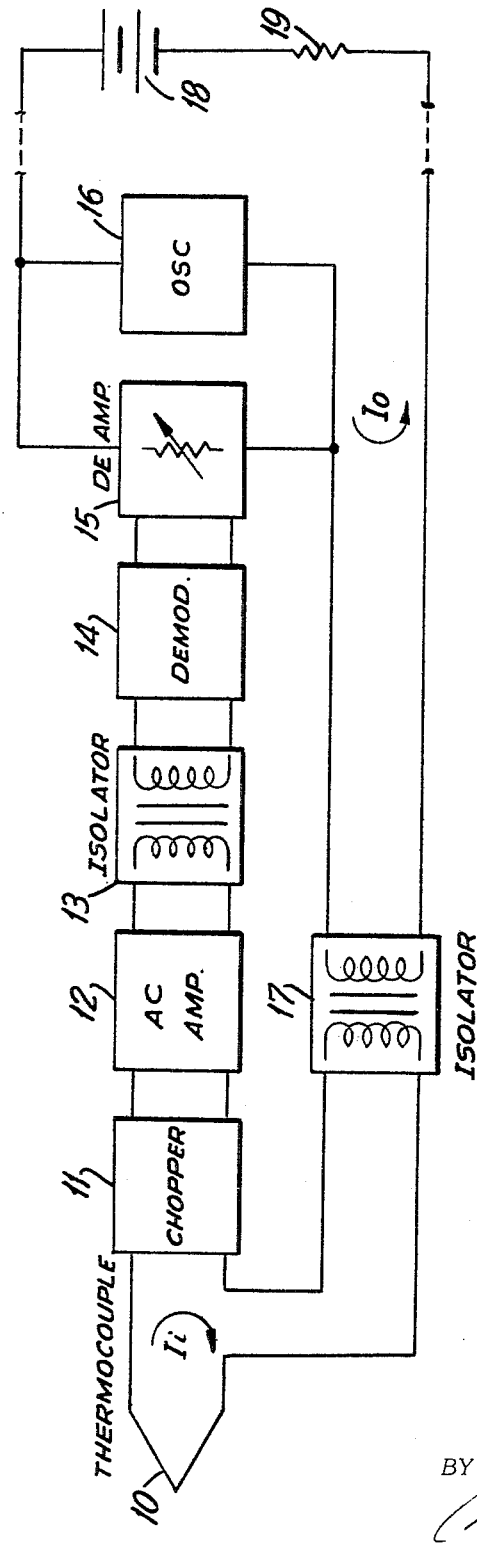

3,483,476
MILLIVOLT-TO-CURRENT CONVERTER
Tamotsu Kobayashi and Isao Asai, Hatboro, Pa., assignors to Fischer & Porter Co., Warminster, Pa., a corporation of Pennsylvania
Filed Sept. 19, 1966, Ser. No. 580,260
Int. Cl. H03f 3/38
U.S. Cl. 330—10　　　　　　　　　　　　　　5 Claims

ABSTRACT OF THE DISCLOSURE

A millivolt-to-current converter powered by a single D-C source located at a remote load station, the varying millivolt output of a transducer being chopped, amplified and demodulated and then applied to a voltage-responsive variable impedance device which is connected by a two-wire transmission line to the load at the remote station in series with the D-C source whereby the resultant current through the load is varied as a function of the impedance of the device.

---

This invention relates generally to a millivolt-to-current converter, and in particular, to one which may be used as an adjunct to a thermocouple.

As is well known, the thermocouple is the name given to the juncture of two wires of dissimilar materials which, when one junction is maintained at a higher temperature than the other, an output is produced which is a function of the temperature difference. Since the output is relatively small, its transmission over any distance creates a problem due to the normal attenuation of the transmission line. Accordingly, it is a conventional practice to amplify such an output before injecting it into the transmission line.

Present millivolt-to-current converters satisfying the amplification function generally need separate lead wires for power supply and thermocouple signal. A further complication exists because most millivolt to current converters are powered by standard 117 volt A.C. Hence, the wires must be separated physically to avoid noise pickup. Thus, the installation cost of present converters is relatively expensive.

Accordingly, it is the object of this invention to provide a novel millivolt-to-current converter particularly for use with thermocouples, which obviates the foregoing disadvantages and provides a simple, reliable and relatively inexpensive converting arrangement.

Briefly, the present invention is predicated upon an extension of the two wire concept to millivolt to current conversion and the ultimate realization of a new converter powered by a single D.C. source, where the current to and from the source is proportional to the thermocouple input in millivolts.

The above mentioned and other features and objects of this invention and the manner of attaining them will become more apparent and the invention itself will best be understood by reference to the following description of an embodiment of the invention taken in conjunction with the accompanying drawings wherein the single figure illustrates the inventive concept in block form.

Turning now to the figure, the output of thermocouple 10 is fed to a chopper 11 in series with isolator 17 (whose function will be described later). The chopper converts the thermocouple output to a square wave form acceptable to the A.C. amplifier 12. The now A.C. amplified output of the thermocouple is fed to isolator 13. Thus, we have traced a first path for current $I_1$ which includes the thermocouple 10, the chopper 11, A.C. amplifier 12, and the two isolators 13 and 17.

The output of isolator 13 is demodulated by circuit 14, which may consist of, for example, a phase sensitive rectifier or a conventional phase detector, excited by the local oscillator 16 which is also employed to excite chopper 11.

To maintain the simplicity of the figure, the excitation lines of the oscillator 16 have been omitted. This local oscillator, however, also excites the isolators and provides a floating D.C. supply for the A.C. amplifier. If necessary, a bias circuit may be inserted between the thermocouple 10 and isolator 17 and also provided with a floating D.C. supply via the oscillator. While not particularly shown, the oscillator may be stabilized by a voltage regulator if stability becomes a problem.

The now demodulated signal (D.C.) is injected into a transistorized D.C. amplifier 15 which controls the circuit current consumption as will be explained. Since a transistor has the inherent function of changing impedance with input voltage, the transistorized D.C. amplifier 15 acts as a variable impedance (hence it is shown conventionally with the resistance symbol and arrow). Thus, the current $I_0$ flowing through isolator 17, the D.C. amplifier, source 18 and load resistance 19 is dependent upon the resistance of the D.C. amplifier.

Isolator 17 acts as a summing junction feeding back an $I_0$ dependent current which acts as an "error" voltage signal upon the output of the thermocouple 10 thereby influencing the input to chopper 11, and hence the A.C. amplifier 12. This combined output is then fed through isolator 13 to the demodulator and to the D.C. amplifier which now reflects the thermocouple output and influences current $I_0$ into direct dependency.

Thus, it may be seen that the present invention employs a pair of isolated loops to convert a millivolt input into a current output; the output being available over a single transmission line pair (shown broken). Further, source 18 may be simply constituted by a 24 volt D.C. supply available to the circuit over the same line pair without the noise problems which required compensation in previous converters.

What is claimed is:
1. A millivolt-to-current converter adapted to convey the output of a millivolt transducer over a two-wire transmission line to a remote station; the combination comprising:
　(A) a load and a D-C source located at said remote station, and
　(B) a converter disposed adjacent said transducer, said converter including,
　　(a) a chopper coupled to said transducer to convert the output thereof into a periodic wave,
　　(b) an alternating-current amplifier coupled to said chopper to produce an amplified wave,
　　(c) a demodulator,
　　(d) a first isolator for blocking only direct-current and having an input coupled to said amplifier and an output coupled to said demodulator to apply said amplified wave thereto, said demodulator producing a rectified voltage which varies in accordance with the output of said transducer,
　　(e) a voltage-responsive variable impedance device having a pair of input and a pair of output terminals, said input terminals being coupled to said demodulator, said device being responsive to said rectified voltage applied to said input terminals to produce an impedance value at said output terminals which is a function thereof,
　　(f) means connecting said output terminals through said two-wire line to said load in series with said D-C source whereby the current through said load is varied by the value of impedance of said device to produce an output signal,

(g) a second isolator for blocking only direct-current and having an input interposed between said impedance device and said line and an output interposed between said chopper and said transducer to negatively feed back a portion of said signal, and (h) an oscillator power supply connected across said output terminals and energized by the direct voltage appearing at said terminals, said supply producing a direct voltage for energizing said alternating-current amplifier.

2. The millivolt-to-current converter claimed in claim 1, in which said impedance device comprises a transistorized D.C. amplifier.

3. The millivolt-to-current converter claimed in claim 1, in which said demodulator comprises a phase-sensitive rectifier.

4. A converter as set forth in claim 3, further including an oscillator connected to said line and powered by said D-C source to produce an alternating voltage for exciting said phase-detector.

5. A converter as set forth in claim 1, wherein said transducer is a thermocouple.

References Cited

UNITED STATES PATENTS

| | | | |
|---|---|---|---|
| 3,130,373 | 4/1964 | Braymer | 330—9 |
| 3,145,346 | 8/1964 | Henning | 330—10 X |
| 3,221,257 | 11/1965 | Ohlson | 328—3 |

NATHAN KAUFMAN, Primary Examiner

U.S. Cl. X.R.

330—79